United States Patent

Keller et al.

[11] Patent Number: 5,967,762
[45] Date of Patent: Oct. 19, 1999

[54] TURBOCHARGER FOR HIGH PERFORMANCE INTERNAL COMBUSTION ENGINES

[75] Inventors: Robert A. Keller; Hayden D. Austin, both of Moorpark, Calif.

[73] Assignee: Turbonetics, Inc., Moorpark, Calif.

[21] Appl. No.: 08/818,641

[22] Filed: Mar. 14, 1997

Related U.S. Application Data

[60] Provisional application No. 60/013,638, Mar. 18, 1996.

[51] Int. Cl.[6] .................................................. F04B 17/00
[52] U.S. Cl. ........................................................... 417/407
[58] Field of Search ..................................... 417/405, 407

[56] References Cited

U.S. PATENT DOCUMENTS

| | | | |
|---|---|---|---|
| 2,749,842 | 6/1956 | Angell et al. | 417/407 |
| 2,910,005 | 10/1959 | Angell et al. | 417/407 |
| 3,132,594 | 5/1964 | Shiley et al. | 417/407 |
| 4,285,632 | 8/1981 | DeSalve | 417/407 |
| 4,370,106 | 1/1983 | Lauterbach | 417/407 |
| 4,541,786 | 9/1985 | McLean | 417/407 |
| 4,641,977 | 2/1987 | Woollenweber | 417/407 |
| 4,721,441 | 1/1988 | Miyashita | 417/407 |
| 4,808,091 | 2/1989 | Ruetz | 417/407 |

*Primary Examiner*—Michael Koczo
*Attorney, Agent, or Firm*—Wagner Middlebrook & Kimbell, LLP

[57] ABSTRACT

A turbocharger includes a main shaft carrying a turbine wheel and an impeller. The shaft is supported in a housing by means of a floating bearing and a ball bearing which is particularly effective in resisting axial loads tending to move the shaft toward the impeller. A preload spring positioned between the stationary race of the ball bearing and a thrust plate fixed to the housing provides a force urging said ball bearing against a shoulder on the main shaft against thrust forces tending to move the shaft toward the turbine wheel.

13 Claims, 2 Drawing Sheets

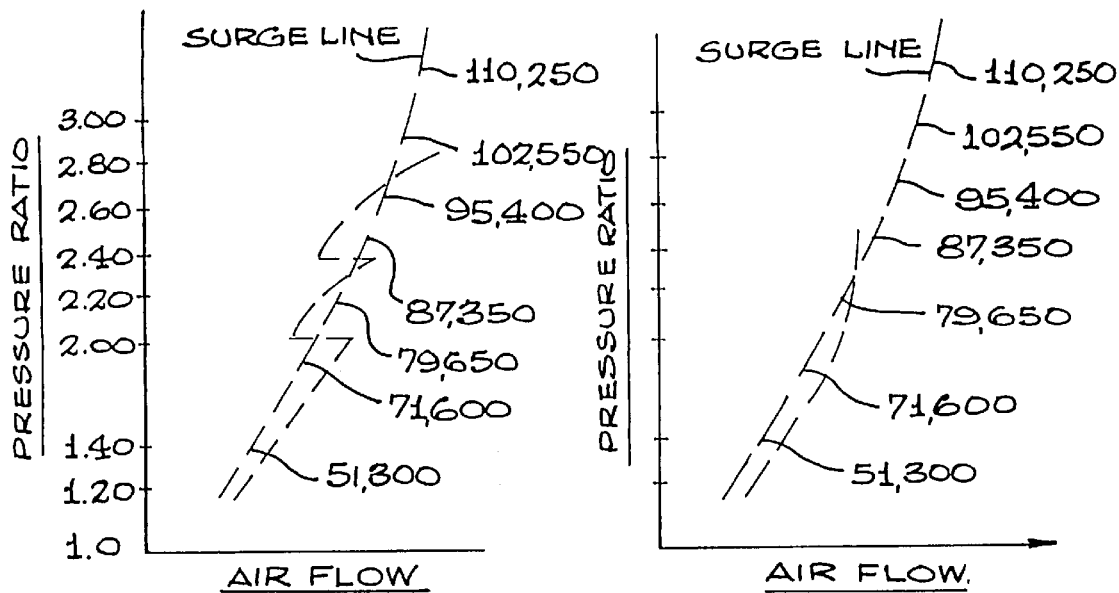
FIG. 1
FIG. 2
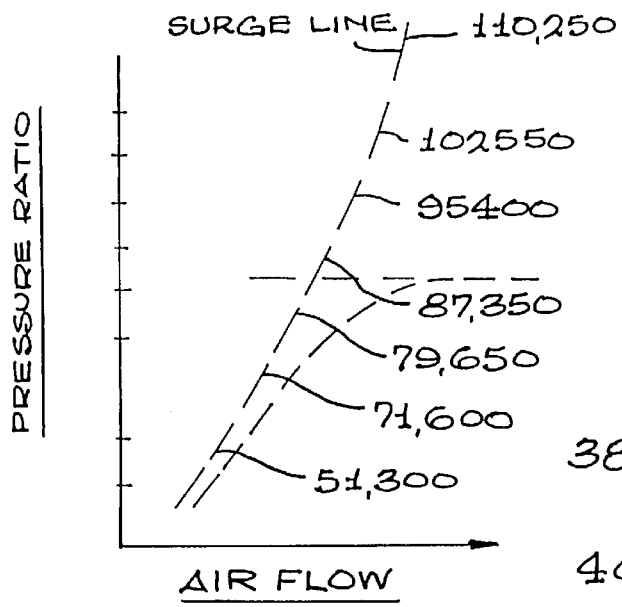
FIG. 3
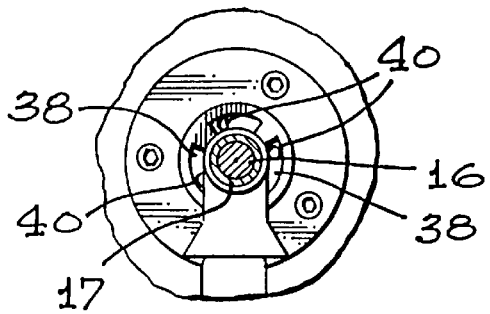
FIG. 5

5,967,762

TURBOCHARGER FOR HIGH PERFORMANCE INTERNAL COMBUSTION ENGINES

CROSS REFERENCE TO RELATED APPLICATION

This application is based upon and claims benefit of provisional patent application 60/013,638 filed Mar. 18, 1996.

BRIEF SUMMARY OF THE INVENTION

This invention relates to turbochargers for internal combustion engines and more particularly to a turbocharger having a special thrust sector for withstanding certain unusual forces encountered with high performance engines.

Physical failures of turbochargers employed for performance applications have plagued the motorsports industry since their introduction as a viable means of boosting specific engine horsepower. This observation is not unexpected when the basic design criteria of a turbocharger are examined.

Most turbochargers utilized in popular motorsports are adaptations of units originally designed for much more conservative use. Almost without exception, motorsports performance turbochargers have their genesis in commercial diesel applications. As a result, the basic design structure of all turbochargers is essentially identical. This reliance on a common support concept for rotating groups functioning under dramatically different operational environments has led to failure modes never anticipated in the initial design process.

Turbochargers employed in motorsports are typically pressed to the extremes of their functional limits. In a competitive scenario, it is the rule rather than the exception to take a component to its failure limit for maximum performance. Accordingly, knowledge of the elements involved in the functional failure of performance turbochargers can be utilized as the basis for designing a more durable unit.

Performance turbocharger failure modes have been grouped into three categories as follows:

Operational induced failures

Thermally induced failures

Dynamic failures

Conventional diesel turbochargers perform in a relatively stable functional environment where all of the operational variables are generally known and the turbocharger has been designed, tested and manufactured with these conservative limits in mind. Even turbochargers utilized in production gasoline-powered automobiles are sized and controlled well within conventional design limits.

Motorsports applications, however, call for turbocharger performance never anticipated in the original design. Pressure ratio and surge are two key operational parameters which have the greatest impact on turbocharger performance.

High specific power output from a given engine is a function of the mass flow of air processed by the engine. This, of course, is a function of engine displacement, engine speed, volumetric efficiency and the density of the charge air. Charge air density is a function of both pressure and temperature. Turbocharger performance is usually rated as a function of compressor pressure ratio and flow. For a given engine application, increasing the compressor pressure ratio will increase compressor flow and, ultimately, the specific power output (assuming all other engine control functions are adequate). Excessively high design pressure ratios can exceed the functional capability of the turbocharger employed.

To deal with the various factors resulting in failure modes of the turbocharger, applicants have provided a turbocharger with a substantially modified and augmented thrust section. In place of a conventional support bearing, a ball bearing is used in combination with a preload spring, a separate thrust bearing and thrust plate and a thrust collar all of which absorb a substantial amount of axial thrust and provide considerable protection from the large pressure peaks which can occur in motorsport activities.

BRIEF DESCRIPTION OF THE DRAWINGS

This invention may be more clearly understood with the following detailed description and by reference to the drawings in which:

FIG. 1 is a graph of air flow vs pressure ratio for a turbocharger experiencing "drive through" compressor surge;

FIG. 2 is a graph of air flow vs pressure ratio showing a turbocharger which runs into the compressor stall region;

FIG. 3 is a graph of air flow vs. pressure ratio for a turbocharger which is run into "decel surge";

FIG. 5 is a sectional drawing taken along line 5—5 of FIG.

DETAILED DESCRIPTION OF THE PREFERRED EMBODIMENT

Figure 4:
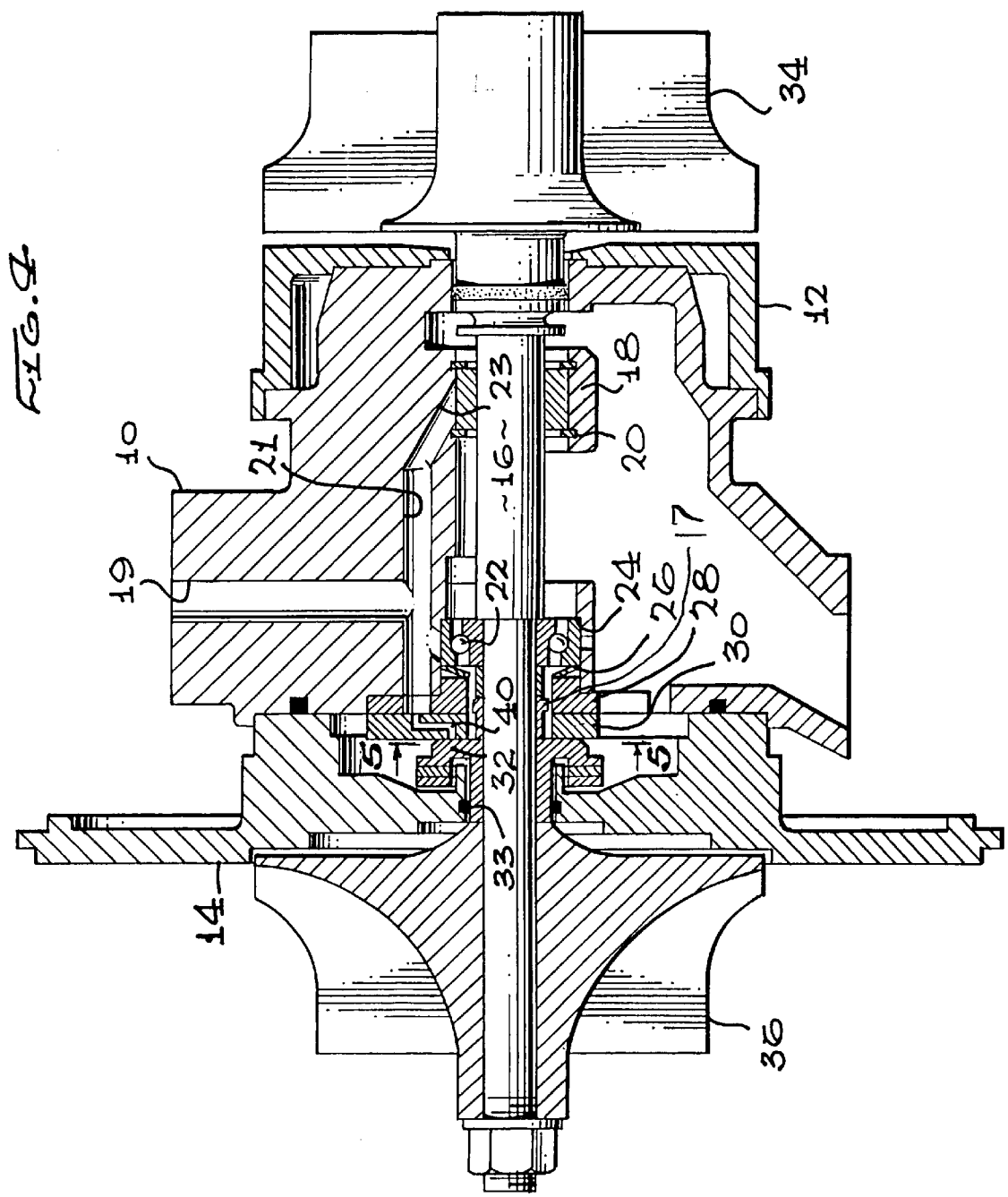
FIG. 4 is a sectional drawing of a turbocharger rotating assembly incorporating the new thrust section of the invention.

Compressor surge as a result of attempting to force a turbocharger to perform in a region of design instability can be a minor or major concern. It is not unusual for a rapidly accelerating turbocharger to pass through a momentary period of mild surge during the acceleration process. This is fairly common with engines that must perform over a relatively large flow range with a turbocharger that has been matched for high end performance. Usually, the momentum of the rotating group is more than adequate to allow the compressor to "drive through" this region of compressor instability. The drive through surge path for a typical compressor is illustrated in FIG. 1 with the heavy dashed line indicating momentary excursions into the surge region. The numerals indicate revolutions per minute of a typical turbocharger at various points along the surge line.

Serious surge can occur, however, when an attempt is made to load the engine at a given speed and sustain that load for a period of time. Under these conditions, the rotating speed can increase significantly due to an increase in thermal energy presented to the turbine when exposed to the sustained power operations. Increased compressor speed will cause a rise in pressure ratio which may cross the surge boundary as illustrated in FIG. 2. The resultant surge created under these conditions can induce a compressor stall which may actually cause the engine to shut down due to the momentary interruption of air flow from the compressor. This situation is not uncommon in marine racing and tractor pulling. In cases where the engine continues to operate, compressor stall can be perceived as a repeating misfire and a reduction of power.

Besides creating potential engine performance problems, continuous surge imposes abnormal loads on the thrust section of a turbocharger. This load can be compared to a continuous series of "hammer" blows due to the severe pressure cycling across the compressor wheel or impeller under surge. Depending on the intensity and duration involved, premature thrust bearing/collar failure may result. Design considerations to minimize operational surge and related failures are:

a. proper compressor selection for the desired flow range;
   b. suitable control program—need to limit boost as a function of load and/or engine speed;
   c. closer ratio vehicle gear selection (to reduce loading); and
   d. increased volume in the compressor discharge tract—this creates an accumulator effect to soften surge intensity.

Another form of compressor surge which has become more common and which also imposes severe thrust section failure is known as "decel surge". Decel surge, illustrated in FIG. 3, occurs when an engine which is running at/or near full power at/or near full controlled boost is suddenly exposed to a full-throttle closure. This sudden blockage of the compressor discharge path produces peak-pressure spikes which can instantly destroy the thrust section of the turbocharger. This is the ultimate surge consideration since air flow is essentially zero and discharge pressure is not only at the maximum as a function of the compressor speed but is also significantly increased by the inertia of the air slug involved. Instantaneous pressure spikes of over 100 psi have been noted during decel surge. In the case of a 4" diameter compressor wheel, a 100 psi pressure spike can result in a thrust "hammer" of over 1000 lbs force—far in excess of any standard turbocharger thrust capability. Design considerations to reduce decel surge and related failures are:

1. Utilization of a bypass valve located between the compressor discharge and the throttle-body. The valve may be controlled by throttle differential or linkage operated. Actual discharge pressure may also be used as the actuation means.
   2. Utilization of a draw-through throttle instead of a blow-through design.
   3. Utilization of draw-through throttle in conjunction with a blow-through throttle.

The above measures to control loads on the thrust section of a turbocharger have proven inadequate in many cases to deal with the severe peak pressure spikes and resulting damage to the thrust section which occur as a result of decel surge which results from an abrupt full throttle closure. To deal with this problem, applicants have provided a redesigned thrust section including a ball bearing, a preload spring, a thrust plate, a thrust bearing and a thrust collar.

Referring to FIG. 4, the rotating assembly portion of a turbocharger incorporating our invention includes a bearing housing 10 having attached thereto a heat shroud 12. A stationary seal plate 14 is affixed to and forms part of the housing. Carried within housing 10 is a rotatable shaft 16 which is supported in housing 10 by means of a floating bearing 18 secured in position by snap rings 20 and a ball bearing 22.

At one end of shaft 16 is a turbine wheel 34 which is driven by exhaust gasses. At the opposite end of shaft 16 is an impeller 36 which, together with its housing (not shown) constitute the compressor portion of the turbocharger.

The floating bearing 18 is connected to an oil feed source consisting of passages 19, 21 and 23 and literally floats on a layer of oil, turning within bearing housing 10 and on shaft 16 at a significant speed but less than the rotational speed of shaft 16. A typical prior art turbocharger would have a second floating bearing in the location of ball bearing 22. Such a structure is not capable of handling severe thrust loads. The outside race of ball bearing 22 which preferably includes balls of a special ceramic type designed to withstand high thrust loads, is urged to the right against a shoulder 24 of honsing 10 by means of a preload spring 26. The balls of bearing 22 are of steel, silicon nitride or similar ceramic material which is extremely hard. The inside race of bearing 22 is captured between a shoulder of shaft 16 and an annular spacer 17 on shaft 16. The outside race of bearing 22 has greater thickness on one side of said balls to resist any translation of the balls toward the impeller 36. On the opposite side of spring 26 from bearing 22 is a thrust plate 28 and a thrust bearing 30 shown in more detail in FIG. 5 which is a sectional view taken along line 5—5 of FIG. 4. A thrust collar 32 abuts against the opposite side of thrust bearing 30. Oil under pressure flows from passages 19 and 21 through passages 40 in thrust bearing 30 and impacts against thrust collar 32 which rotates with shaft 16. Thrust collar 32 abuts against collar 17 and extends axially along shaft 16 where it contacts a carbon ring 33 constituting a dynamic seal between thrust collar 32 and seal plate 14.

FIG. 5 is a sectional view taken along line 5—5 of FIG. 4 and shows the face of the thrust bearing 30 where it abuts against the thrust collar 32. The shaft 16 is shown as well as the collar 17, both of which rotate. The thrust bearing 30, which is stationary, includes a plurality of small area pads 38 which abut against thrust collar 32 and each of which carries a small oil port which is an outlet of a passage 40 supplying oil to enable thrust collar 32 to rotate smoothly relative to thrust bearing 30.

It is not unusual for the shaft 16 to turn as fast as 150,000 RPM or more. If a full throttle closure occurs at such time, the resulting total blockage of the compressor discharge path results in a severe peak pressure spike tending to cause shaft 16 to be moved violently toward the left. This severe movement must be absorbed by the thrust section of the turbocharger.

Applicants have found that by replacing a floating bearing with a securely positioned ball bearing as described above, the capability for the turbocharger to absorb substantial axial thrust has been improved many fold. With the ball bearing 22, and with preload spring 26, thrust plate 28, thrust bearing 30 and the thrust collar 32 located as shown, the durability of a turbocharger under severe service is far better than with the prior art arrangement described above. While this structure should not be relied upon alone to avoid all damage to the thrust section in the case of surge decel, it, in combination with one or more of the measures mentioned above, will avoid destruction of the thrust sector of the turbocharger.

The above described embodiments of the present invention are merely descriptive of its principles and are not to be considered limiting. The scope of the present invention instead shall be determined from the scope of the following claims including their equivalents.

We claim:

1. A turbocharger for internal combustion engines comprising a rotatable shaft, an exhaust gas driven turbine wheel secured to said shaft, a centrifugal impeller secured to said shaft, a housing and bearings in said housing supporting said shaft, at least one of said bearings having balls and fixed and rotatable races, said fixed race having greater thickness on one side of said balls to resist thrust loading between said races;

said housing including a seal plate substantially closing the end of said housing adjacent said impeller, a rotatable thrust collar carried on said shaft, a seal positioned between said rotatable thrust collar and said seal plate, a stationary thrust bearing carried in said housing positioned adjacent said rotatable thrust collar, and said housing further includes lubrication conduits and said thrust bearing includes ports adjacent said rotatable thrust collar and passages connecting said ports with said lubrication conduits.

2. A turbocharger for internal combustion engines as claimed in claim 1 wherein said bearing having fixed and rotatable races is a ball bearing having balls of ceramic material.

3. A turbocharger as claimed in claim 1 wherein another of said bearings is a floating bearing which is free to turn at a speed different from the speed of said shaft.

4. A turbocharger as claimed in claim 3 wherein said lubrication conduits are also connected to said floating bearing.

5. A turbocharger for internal combustion engines comprising a rotatable shaft, an exhaust gas driven turbine wheel secured to said shaft, a centrifugal impeller secured to said shaft, a housing and bearings in said housing supporting said shaft, at least one of said bearings being a ball bearing having balls and fixed and rotatable races, said fixed race having greater thickness on one side of said balls to resist axial thrust forces, and a preload spring urging the fixed race of said ball bearing against said housing opposing axial thrust loads tending to move said shaft in the direction of said centrifugal impeller; and a thrust plate is secured in said housing and said preload spring is positioned between said thrust plate and the fixed race of said ball bearing.

6. A turbocharger as claimed in claim 5 wherein a thrust bearing including lubricant carrying means is positioned between said thrust plate and said rotatable thrust collar.

7. A turbocharger as claimed in claim 5 wherein another of said bearings is a floating bearing which is free to turn at a speed different from the speed of said shaft.

8. A turbocharger for internal combustion engines comprising a rotatable shaft, an exhaust gas driven turbine wheel secured to said shaft, a centrifugal impeller secured to said shaft, a housing and bearings in said housing supporting said shaft, at least one of said bearings being a ball bearing having balls and fixed and rotatable races, said fixed race having greater thickness on one side of said of said balls to resist axial thrust forces, and a preload spring urging the fixed race of said ball bearing against said housing opposing axial thrust loads tending to move said shaft in the direction of said centrifugal impeller; and a rotatable thrust collar is carried on said shaft and a seal is positioned between said rotatable thrust collar and said housing.

9. A turbocharger as claimed in claim 8 wherein an annular spacer is positioned on said shaft between said rotatable thrust collar and the rotatable race of said ball bearing.

10. A turbocharger for internal combustion engines comprising a rotatable shaft, an exhaust gas driven turbine wheel secured to said shaft, a centrifugal impeller secured to said shaft, a housing and bearings in said housing supporting said shaft, at least one of said bearings being a ball bearing having balls and fixed and rotatable races, said fixed race having greater thickness on one side of said balls to resist axial thrust forces, a preload spring urging the fixed race of said ball bearing against said housing opposing axial thrust loads tending to move said shaft in the direction of said centrifugal impeller; and wherein said housing includes a seal plate substantially closing the end of said housing adjacent said impeller, a rotatable thrust collar is carried on said shaft and a seal is positioned between said rotatable thrust collar and said seal plate.

11. A turbocharger for internal combustion engines comprising a rotatable shaft, an exhaust gas driven turbine wheel secured to said shaft, a centrifugal impeller secured to the opposite end of said shaft, a housing and bearings in said housing supporting said shaft and lubrication conduits in said housing for carrying lubricant material to said bearings, characterized in that one of said bearings is a ball bearing having balls and fixed and rotatable races, said fixed race having greater thickness on one side of said balls to resist axial thrust loads directed toward said impeller and a preload spring is positioned in said housing urging the fixed race of said ball bearing against said housing in a direction opposing axial thrust loads tending to move said shaft in the direction of said centrifugal impeller, said housing further including a thrust plate secured in said housing and said preload spring is positioned between said thrust plate and the fixed race of said ball bearing.

12. A turbocharger as claimed in claim 11 wherein a rotatable thrust collar is carried on said shaft and a seal is positioned between said rotatable thrust collar and said housing.

13. A turbocharger as claimed in claim 11 wherein a thrust bearing is positioned between said thrust plate and said rotatable thrust collar, said thrust bearing being operatively connected to said lubrication conduits and including lubrication ports adjacent said rotatable thrust collar.

* * * * *